United States Patent [19]

Van Den Berg et al.

[11] Patent Number: 5,302,347
[45] Date of Patent: Apr. 12, 1994

[54] APPARATUS FOR CYCLINCIAL TEMPERATURE PROCESS WITH AUTOMATIC MONITORING AND ADJUSTING OF THE TEMPERATURE OF A WATER BATH

[75] Inventors: Van Den Berg, Hoofddorp; Heiman H. Volkens, Monnickendam, both of Netherlands

[73] Assignee: Kreatech Biotechnology B.V., Amsterdam, Netherlands

[21] Appl. No.: 923,938

[22] PCT Filed: Feb. 28, 1991

[86] PCT No.: PCT/NL91/00034
§ 371 Date: Sep. 3, 1992
§ 102(e) Date: Sep. 3, 1992

[87] PCT Pub. No.: WO91/12888
PCT Pub. Date: Sep. 5, 1991

[30] Foreign Application Priority Data
Feb. 28, 1990 [NL] Netherlands .................. 9000481

[51] Int. Cl.$^5$ ........................................... G01N 21/00
[52] U.S. Cl. ........................................ 422/67; 422/99; 422/103; 435/290; 935/85; 935/87; 935/88
[58] Field of Search .................. 422/67, 21, 99, 102, 422/103; 435/91.6, 809, 290; 935/85, 86, 87, 88; 436/147

[56] References Cited

U.S. PATENT DOCUMENTS

| 3,663,783 | 5/1972 | McKague | 219/10.55 B |
| 5,108,701 | 4/1992 | Zakaria et al. | 422/21 |
| 5,123,477 | 6/1992 | Tyler | 935/85 |
| 5,133,940 | 7/1992 | Kaikkinen et al. | 935/88 |
| 5,187,084 | 2/1993 | Hallsby | 435/290 |

FOREIGN PATENT DOCUMENTS

| 0261007 | 3/1988 | European Pat. Off. |
| 3808942 | 9/1989 | Fed. Rep. of Germany |
| WO8909437 | 10/1989 | World Int. Prop. O. |

Primary Examiner—James C. Housel
Assistant Examiner—Lien Tran

[57] ABSTRACT

An apparatus for cyclical temperature processes with automatic monitoring and adjusting of the temperature of a water bath, including a reactor space with a water bath in which a plurality of sample containers with samples to be examined can be placed. The desired temperatures and periods during which each adjusted temperature should be maintained are adjustable by an adjustment means, wherein a temperature sensor for measuring the temperature of the water bath is provided and a control unit controls the temperature of the water bath in dependence on the measured temperature and time. At least one magnetron tube is provided in the reactor space for heating the water bath and the sample containers placed in the same. The water bath is connectable to a water conduit through a water supply conduit wherein the control unit controls the magnetron tube and the valve in dependence on the desired temperature and time.

2 Claims, 1 Drawing Sheet

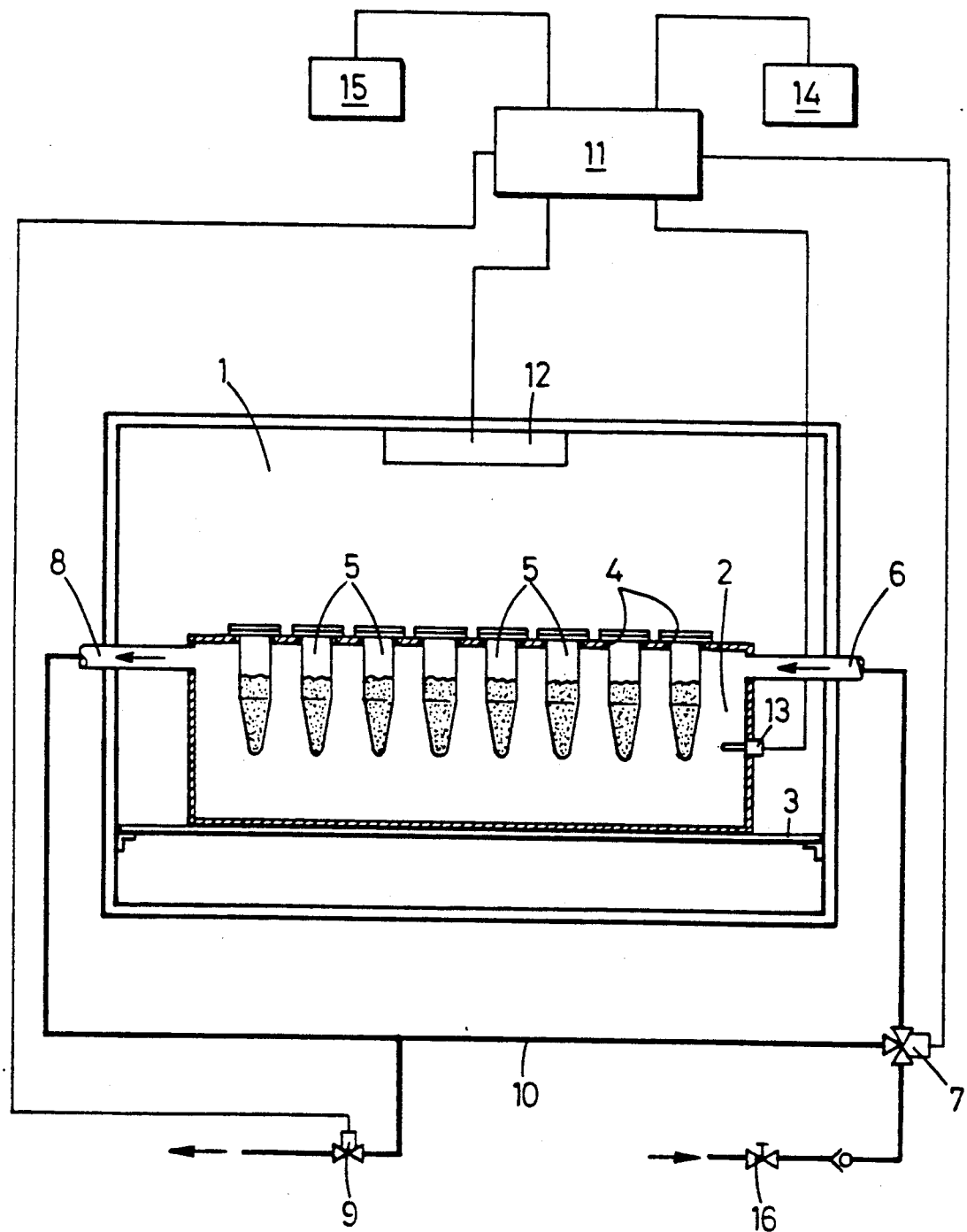

APPARATUS FOR CYCLINCIAL TEMPERATURE PROCESS WITH AUTOMATIC MONITORING AND ADJUSTING OF THE TEMPERATURE OF A WATER BATH

FIELD OF THE INVENTION

The invention relates to an apparatus for automatically performing a biotechnological process at different desired temperatures, comprising a reactor space with a water bath in which a plurality of sample containers with samples to be examined can be placed, adjustment means to adjust the desired temperatures and periods during which each adjusted temperature should be maintained, a temperature sensor for measuring the temperature of the water bath and a control unit for controlling the temperature of the water bath in dependence on the measured temperature and time.

BACKGROUND OF THE INVENTION

An apparatus of this type is used recently mainly for applying a technique receiving a lot of attention and generally indicated by Polymerase Chain Reaction (PCR). This technique is based on a cyclically repeated DNA synthesis by means of a thermostable DNA polymerase. For applying this PCR technique the sample containers with the samples to be treated should be able to be maintained at three different temperatures during three different periods. Further passing through these temperatures should be cyclically repeated a number of times. As an example a cycle can be mentioned of subsequently 95° C. during 1 minute, 37° C. during 30 s and 65° C. during 3 minutes, which cycle should be passed through 32 times.

In a known apparatus of this type the water bath is filled each time from one of three reservoirs in which water with the respective desired temperature is contained, in order to realize the three desired temperatures. Thereby the known apparatus has a rather complicated construction. Moreover the water in the different reservoirs has to be maintained at the desired temperature, wherein the water at the high temperature of 95° C. evaporates quickly, while the water at the low temperature of 95° C. evaporates quickly, while the water at the low temperature of 37° C. forms an ideal medium for pollutants. Further this known apparatus has the disadvantage that the sample containers are heated indirectly by the water, whereby it takes a long time before the samples themselves have reached the desired temperature. The overall process thereby takes a lot of time.

In an other known apparatus Peltier elements are used for realizing the different desired temperatures. This known apparatus also has the disadvantage that the desired temperature of the samples themselves is reached only slowly due to the indirect heating. Further the temperature distribution along the carrier for the sample containers heated by the Peltier elements is not uniform.

SUMMARY OF THE INVENTION

The invention aims to provide an apparatus of the above-mentioned type wherein the disadvantages of the known apparatus are obviated in an effective manner.

To this end the apparatus of the above-mentioned type is according to the invention characterized in that at least one magnetron tube is mounted in the reactor space for heating the water bath and the sample containers placed in the same and in that the water bath is connectable to a water conduit through a water supply conduit wherein the control unit controls the magnetron tube and the valve in dependence on the desired temperature and time.

In this manner it is obtained that the samples in the sample containers can be brought quickly at the desired temperature because the samples together with the water bath are directly heated by the microwave radiation of the magnetron tube. To reach the low temperature of for example 37° C. the samples can be cooled quickly by supplying fresh cold water to the water bath. In the apparatus according to the invention it is not necessary to maintain several water supplies at different temperatures. Thereby no problems like evaporation and bacterial growth in the water bath occur. Because the samples can be brought quickly at the desired temperatures, the overall process time can be shortened substantially. Further it is possible to cool very quickly the samples after the end of the overall process, whereby the treated samples can be preserved well.

Preferably, an electrically operable valve is provided in the water supply conduit, said valve being controllable by the control unit. Thereby the control unit can also maintain the supply of cold water in dependence on the different desired temperatures.

The invention will be further explained by reference to the drawing, in which an embodiment of the apparatus according to the invention is shown very schematically.

BRIEF DESCRIPTION OF THE DRAWING

FIG. 1 is a drawing of an apparatus adapted to automatically perform a biotechnological process known as Polymerase Chain Reaction (PCR). This process is based on a cyclically repeated DNA synthesis by means of a thermostable DNA polymerase. This process includes for example 32 cycles wherein a sample is maintained during predetermined periods at predetermined temperatures. The PCR cycle may for example comprise a period of 1 minute during which the sample is maintained at 95° C., a period of 30 s during which the sample is maintained at 37° C. and a period of 3 minutes during which the sample is maintained at 65° C. The several periods are indicated generally by incubation period.

DETAIL DESCRIPTION OF THE PREFERRED EMBODIMENT

The apparatus shown comprises a chamber 1 which can be closed by a door not shown in the drawing. A closed water bath 2 is supported on a support plate 3 in the chamber 1, which water bath is provided with a plurality of adjacent rows of receiving spaces 4 for small reaction vessels 5, only one row of receiving spaces 4 being shown in the drawing. It is noted that the chamber i, the water bath 2 and the receiving spaces for reaction vessels 5 are not shown to scale in the drawing.

The water bath 2 is provided with an inlet line 6 which is connectable to a water conduit indicated by an arrow through an electrically operable mixing valve 7. Further the water bath 2 has an outlet line 8 which is connected with a discharge through an electrically operable valve 9 and is connected with the mixing valve 7 through a return line 10. If desired a circulating pump can be included in the return line for circulating the water through the water bath 2. It is also possible to provide a normal electrically operable valve in the inlet line 6 and to have the outlet line 8 debouching directly to a discharge, in which case a return line is not provided.

The above-mentioned valves 7 and 9 are operated by a control unit 11. This control unit 11 further controls a magnetron tube 12 mounted in the chamber 1 for generating microwave radiation in the chamber I to heat directly the samples contained in the reaction vessels 5. Further a temperature sensor 13 for measuring the temperature of the water in the water bath 2 is connected to the control unit 11.

A key board 14 is provided for adjusting the different desired temperatures, the incubation periods and the number of subsequent cycles, while further a display means 15 is connected to the control unit 11, by means of which several data can be shown, for example the current temperature of the water in the water bath 2 and the number of cycles finished.

The operation of the described apparatus is as follows.

The three desired temperatures with corresponding incubation periods together with the number of cycles desired are adjusted through the key board 14. A water tap 16 is opened so that the water bath 2 can be filled with water through the mixing valve 7. Subsequently a start button provided on the key board 14 is pressed, whereafter the control unit 11 switches on the magnetron tube 12 so that the water and the sample in the reaction vessels 5 are heated upto 95° C. The mixing valve 7 is closed at this time. The water bath 2 is subsequently maintained at 95° C. during the adjusted incubation period of for example one minute by switching on and off the magnetron tube 12 by means of the control unit 11 in dependence on the temperature of the water in the water bath 2 measured by the temperature sensor 13. Experiments have shown that this temperature of the water accurately corresponds with the temperature of the samples. At this time, if desired, the water can be circulated by a pump not shown to avoid a temperature too high and it is possible to add cold water through the mixing valve 7.

After the first period the control unit 11 switches off the magnetron tube 12 and opens the mixing valve 7 so that a quick cooling to 37° C. is obtained. This temperature is than maintained during 30 seconds for example by switching on the magnetron tube 12 periodically and opening and closing the valve 7.

After the lapse of the period of 30 seconds the control unit 11 closes the mixing valve 7 and switches on the magnetron tube 12 whereby the temperature of the water bath 2 is increased upto 65° C., which temperature is maintained during three minutes for example. After this third period the temperature is increased again upto 95° C. and the described cycle is repeated the said number of times.

After completion of the complete process the valve 7 is opened so that the temperature in the water bath 2 is brought very quickly at the temperature of the cold water.

From the foregoing it will be clear that the apparatus described has the important advantage that the samples in the reaction vessels 5 are directly heated by the microwave radiation whereby the several incubation times can be chosen shorter so that the overall process can be shortened significantly. After the overall process the samples can be cooled quickly whereby the treated samples are preserved well. Further several water baths each to be maintained at a predetermined temperature, are not required anymore, whereby the involved problems of a quick evaporation of the water and a strong pollution are avoided.

The invention is not restricted to the above-described embodiment which can be varied in a number of ways within the scope of the enclosed claims.

We claim:

1. An apparatus for cyclical temperature processes with automatic monitoring and adjusting of the temperature of a water bath, comprising a reactor chamber, a water bath in said chamber a receiver in said chamber for holding a plurality of sample containers with samples to be examined, adjustment means for providing signals representative desired temperatures and incubation periods, a temperature sensor for measuring the temperature of the water bath and a control unit for controlling the temperature of the water bath in response to said temperature sensor and said representative signals, characterized in that at least one magnetron tube is mounted in the reactor chamber for heating the water bath and the sample containers placed in said water bath, the water bath being provided with an inlet line connected to a water conduit through a mixing valve an outlet line leading to a discharge conduit through an operable valve, said outlet line is selectively connected to said mixing valve through a return line, wherein the control unit controls the magnetron tube and said valves in response to said measured temperature and the desired temperature and incubation period.

2. Apparatus according to claim 1, characterized in said valves are electrically operable valve and being controllable by the control unit.

* * * * *

UNITED STATES PATENT AND TRADEMARK OFFICE
CERTIFICATE OF CORRECTION

PATENT NO. : 5,302,347
DATED : April 12, 1994
INVENTOR(S) : Van Den Berg, Herman H. Volkers It is certified that error appears in the above-indentified patent and that said Letters Patent is hereby corrected as shown below:

Title page, left column, line 1, after "FOR" delete "CYCLINCIAL" and insert --CYCLICAL--; line 2, after "TEMPERATURE" delete "PROCESS" and insert --PROCESSES--; line 7, after "Hoofddorp;" delete "Heiman" and insert --Herman--; line 8, after "H." delete "Volkens" and insert --Volkers--;

Col. 1, line 2, after "FOR" delete "CYCLINCIAL" and insert --CYCLICAL--; line 3, before "WITH" delete "PROCESS" and insert "PROCESSES"; line 43, after "quickly," delete "while the water at the low temperature of 95°C. evaporates quickly,";

Col. 2, line 42, after "of" delete "I" and insert --1--; line 58, after "chamber" delete "i" and insert --1--;

Col. 3, line 8, after "chamber" delete "I" and insert --1--;

Col. 4, line 29, after "chamber" (1st occurrence) insert --,--; line 32, after "representative" insert --of--; line 33, after "periods" insert --of the samples--; line 42, after "valve" insert --,--.

Signed and Sealed this

Thirteenth Day of September, 1994

Attest:

BRUCE LEHMAN

*Attesting Officer*          *Commissioner of Patents and Trademarks*